US009059883B2

(12) United States Patent
Tarkoma

(10) Patent No.: US 9,059,883 B2
(45) Date of Patent: Jun. 16, 2015

(54) METHOD AND APPARATUS FOR FACILITATING CONTENT DISTRIBUTION

(75) Inventor: Sasu Tarkoma, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 52 days.

(21) Appl. No.: 13/980,737

(22) PCT Filed: Jan. 20, 2011

(86) PCT No.: PCT/IB2011/050265
§ 371 (c)(1),
(2), (4) Date: Jul. 19, 2013

(87) PCT Pub. No.: WO2012/098433
PCT Pub. Date: Jul. 26, 2012

(65) Prior Publication Data
US 2013/0297738 A1 Nov. 7, 2013

(51) Int. Cl.
*H04L 29/08* (2006.01)
*G06F 17/30* (2006.01)

(52) U.S. Cl.
CPC .... *H04L 29/08702* (2013.01); *G06F 17/30958* (2013.01); *H04L 67/2804* (2013.01); *H04L 67/142* (2013.01)

(58) Field of Classification Search
CPC ................................ H04L 29/08702
USPC .......................... 713/153, 154, 155; 709/217
See application file for complete search history.

(56) References Cited

U.S. PATENT DOCUMENTS

| 8,328,612 | B1* | 12/2012 | Ansari et al. ...................... 463/9 |
| 8,751,788 | B2* | 6/2014 | Leach ............................ 713/152 |
| 2007/0143457 | A1* | 6/2007 | Mao et al. ....................... 709/223 |
| 2007/0261114 | A1* | 11/2007 | Pomerantsev .................. 726/12 |
| 2010/0113158 | A1 | 5/2010 | Chapman et al. |

OTHER PUBLICATIONS

"Sterling Connect: Direct Proxy Single Sign-On Configuration"—IBM, Oct. 2012 ftp://ftp.software.ibm.com/software/commerce/doc/mft/ssp/34/SSP_CD_Proxy_SSO_Book.pdf.*
International Search Report and Written Opinion received in corresponding Patent Cooperation Treaty Application No. PCT/IB2011/050265. Dated Oct. 27, 2011. 16 pages.
"The Analysis of Publish/Subscribe Systems over Mobile Wireless Ad Hoc Networks," by Pongthawornkamol, T.; Nahrstedt, K.; Guijun Wang; Mobile and Ubiquitous Systems: Networking & Services, 2007. MobiQuitous 2007. Fourth Annual International Conference on , vol., No., pp. 1-8, 6-10.

(Continued)

*Primary Examiner* — Randy Scott
(74) *Attorney, Agent, or Firm* — Alston & Bird LLP

(57) ABSTRACT

A method and apparatus are provided for facilitating content distribution. A method may include receiving, at an edge proxy apparatus, a subscription request indicating content to which a subscriber is to be subscribed. The method may further include creating a flow token including content relation information referencing the indicated content and state information enabling delivery of subscribed content to a subscriber apparatus associated with the subscriber. The method may additionally include causing the flow token to be provided to a lookup service apparatus configured to provide access to flow tokens to one or more content publishers. A corresponding apparatus is also provided.

14 Claims, 10 Drawing Sheets

(56) References Cited

OTHER PUBLICATIONS

"The Many Faces of Publish/Subscribe", by Patrick Th. Eugster et ai, ACM Computing Surveys, vol. 35, No. 2, Jun. 2003, pp. 114-131.; whole document.

Bowen Kan; Yongqiang He; Haojie Zhou; Li Zha; ,"0verFly-A Client-Enhanced Publish-Subscribe System," Grid and Cooperative Computing, 2009. GCC '09. Eighth International Conference on , vol., No., pp. 232-237, Aug. 27-29, 2009; whole document; See Chapter 3. C. Delegation model.

* cited by examiner

METHOD AND APPARATUS FOR FACILITATING CONTENT DISTRIBUTION

RELATED APPLICATION

This application was originally filed as PCT Application No. PCT/IB2011/050265 filed Jan. 20, 2011.

TECHNOLOGICAL FIELD

Example embodiments of the present invention relate generally to communications technology and, more particularly, relate to a method and apparatus for facilitating content distribution.

BACKGROUND

The modern computing era has brought about a tremendous expansion in computing power, resulting in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Concurrent with the expansion in computing power, there has been a significant expansion of wireline and wireless networks. Wireless and mobile networking technologies have addressed related consumer demands, while providing more flexibility and immediacy of information transfer. In particular, the Internet has experienced tremendous growth, supporting ever increasing traffic demands and providing support for new applications, including voice and video. However, the architecture of the Internet and other networks has essentially remained unchanged from the original architecture drafted several decades ago. In this regard, content distribution on the Internet continues to generally adhere to the end-to-end principle, in which the network accepts any content sent by a sender and makes a best effort to deliver the content to the receiver.

BRIEF SUMMARY

A system, method, and apparatus are herein provided for facilitating content distribution. Systems, methods, and apparatuses in accordance with various embodiments may provide several advantages to computing devices, computing device users, content publishers, and network operators. In this regard, some example embodiments facilitate content distribution using a publish/subscribe paradigm. More particularly, some example embodiments embed subscription information in flow tokens containing state information enabling delivery of subscribed content to a subscriber apparatus. Flow tokens in accordance with some example embodiments may be stored by a lookup service apparatus. Accordingly, a content publisher may access flow tokens including embedded content relation information corresponding to content to be distributed by the content publisher. The content publisher may then distribute content using the accessed flow tokens to only those users that have subscribed to the content. The inclusion of state information in flow tokens in some example embodiments enables the use of stateless edge proxies for delivering subscribed content to a subscriber.

According to some example embodiments, a method is provided, which may comprise receiving, at an edge proxy apparatus, a subscription request indicating content to which a subscriber is to be subscribed. The methods of these example embodiments may further comprise creating a flow token comprising content relation information referencing the indicated content and state information enabling delivery of subscribed content to a subscriber apparatus associated with the subscriber. The methods of these example embodiments may additionally comprise causing the flow token to be provided to a lookup service apparatus configured to provide access to flow tokens to one or more content publishers.

In other example embodiments, an apparatus comprising at least one processor and at least one memory storing computer program code is provided. The at least one memory and stored computer program code may be configured, with the at least one processor, to cause the apparatus of these example embodiments to at least receive a subscription request indicating content to which a subscriber is to be subscribed. The at least one memory and stored computer program code may be configured, with the at least one processor, to further cause the apparatus of these example embodiments to create a flow token comprising content relation information referencing the indicated content and state information enabling delivery of subscribed content to a subscriber apparatus associated with the subscriber. The at least one memory and stored computer program code may be configured, with the at least one processor, to additionally cause the apparatus of these example embodiments to cause the flow token to be provided to a lookup service apparatus configured to provide access to flow tokens to one or more content publishers.

In other example embodiments, an apparatus is provided that may comprise means for receiving a subscription request indicating content to which a subscriber is to be subscribed. The apparatus of these example embodiments may further comprise means for creating a flow token comprising content relation information referencing the indicated content and state information enabling delivery of subscribed content to a subscriber apparatus associated with the subscriber. The apparatus of these example embodiments may additionally comprise means for causing the flow token to be provided to a lookup service apparatus configured to provide access to flow tokens to one or more content publishers.

In other example embodiments, a method is provided, which may comprise receiving a lookup request sent by a content publisher. The method of these example embodiments may further comprise retrieving a flow token based at least in part on the lookup request. The flow token may comprise content relation information and state information enabling the content publisher to send subscribed content to a subscriber apparatus. The method of these example embodiments may additionally comprise causing the retrieved flow token to be sent to the content publisher in response to the lookup request.

In other example embodiments, an apparatus comprising at least one processor and at least one memory storing computer program code is provided. The at least one memory and stored computer program code may be configured, with the at least one processor, to cause the apparatus of these example embodiments to at least receive a lookup request sent by a content publisher. The at least one memory and stored computer program code may be configured, with the at least one processor, to further cause the apparatus of these example embodiments to retrieve a flow token based at least in part on the lookup request. The flow token may comprise content relation information and state information enabling the content publisher to send subscribed content to a subscriber apparatus. The at least one memory and stored computer program code may be configured, with the at least one processor, to additionally cause the apparatus of these example embodiments to cause the retrieved flow token to be sent to the content publisher in response to the lookup request.

In other example embodiments, an apparatus is provided that may comprise means for receiving a lookup request sent by a content publisher. The apparatus of these example embodiments may further comprise means for retrieving a flow token based at least in part on the lookup request. The flow token may comprise content relation information and state information enabling the content publisher to send subscribed content to a subscriber apparatus. The apparatus of these example embodiments may additionally comprise means for causing the retrieved flow token to be sent to the content publisher in response to the lookup request.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
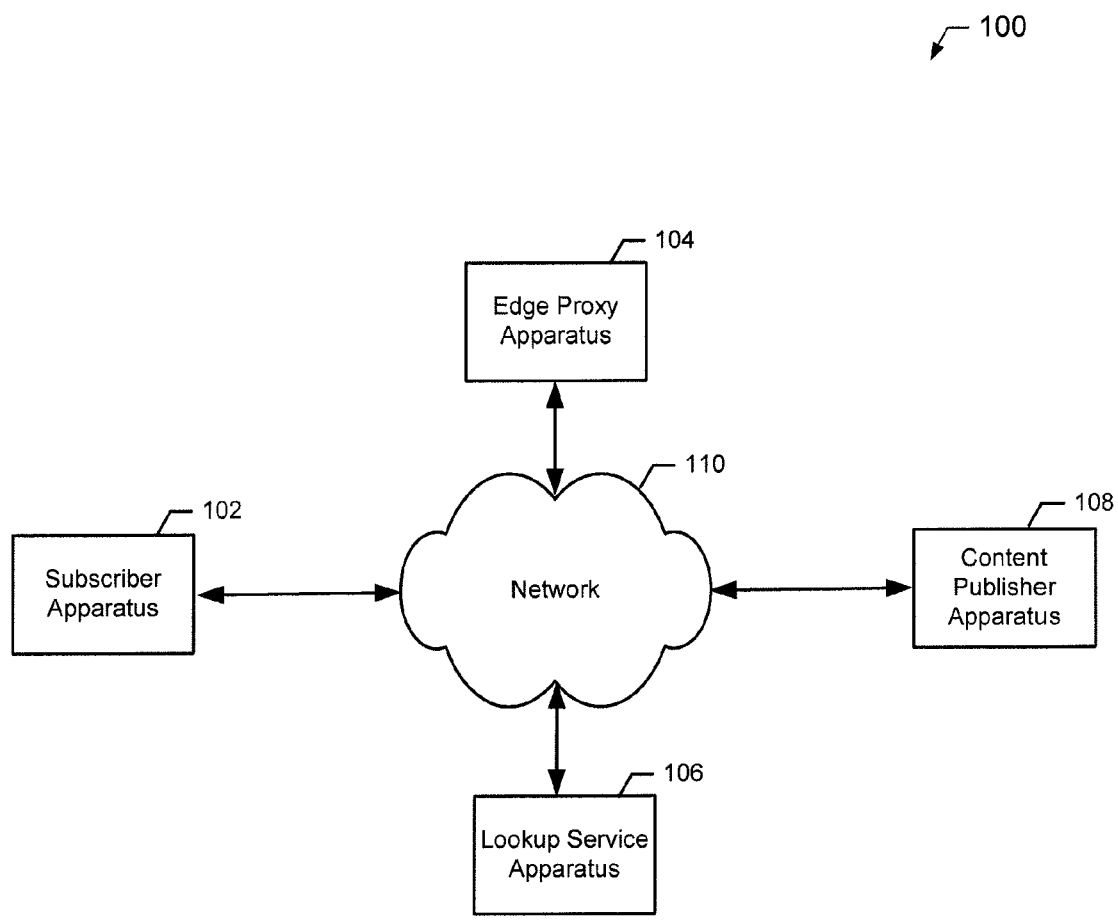
Figure 2:
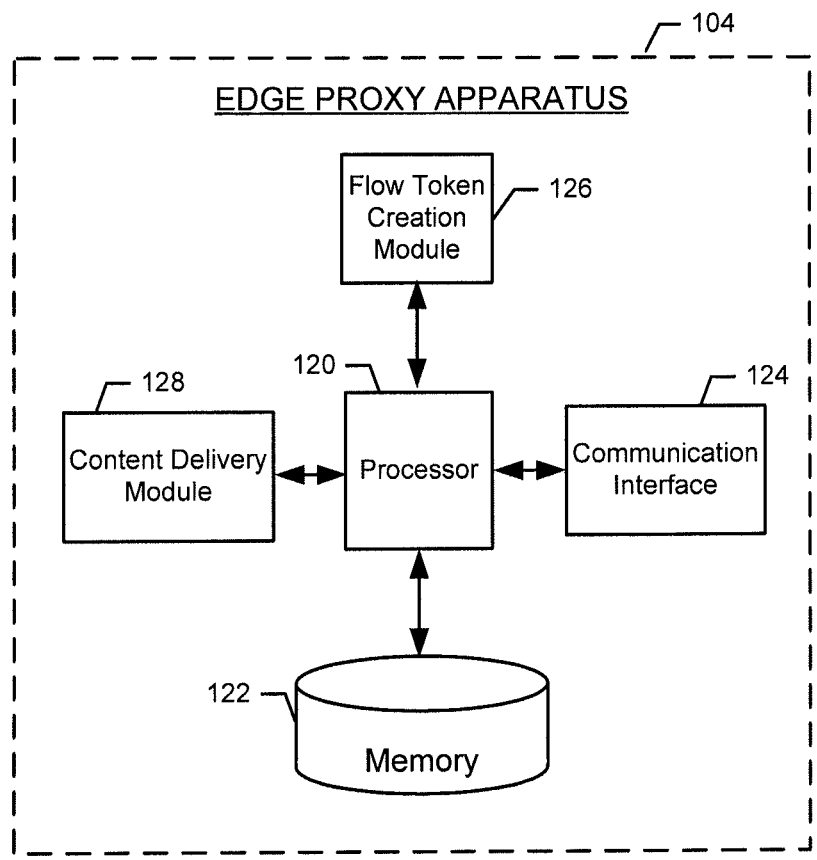
Figure 3:
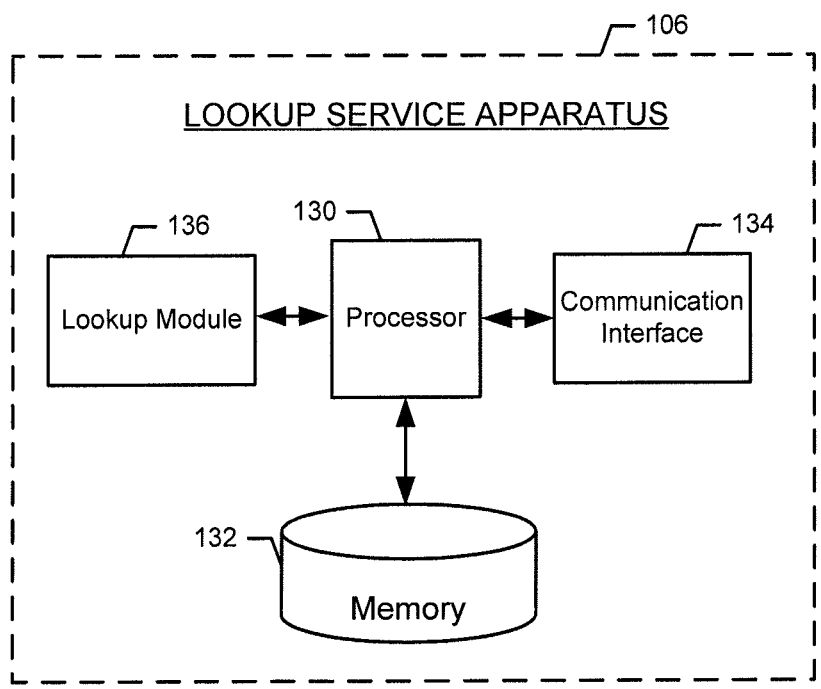
Figure 4:
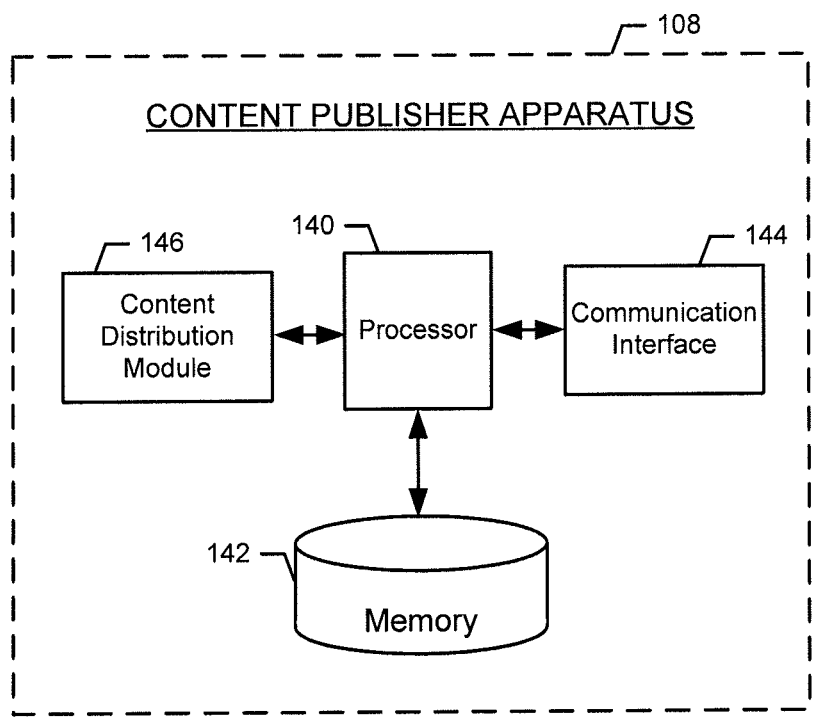
Figure 5:
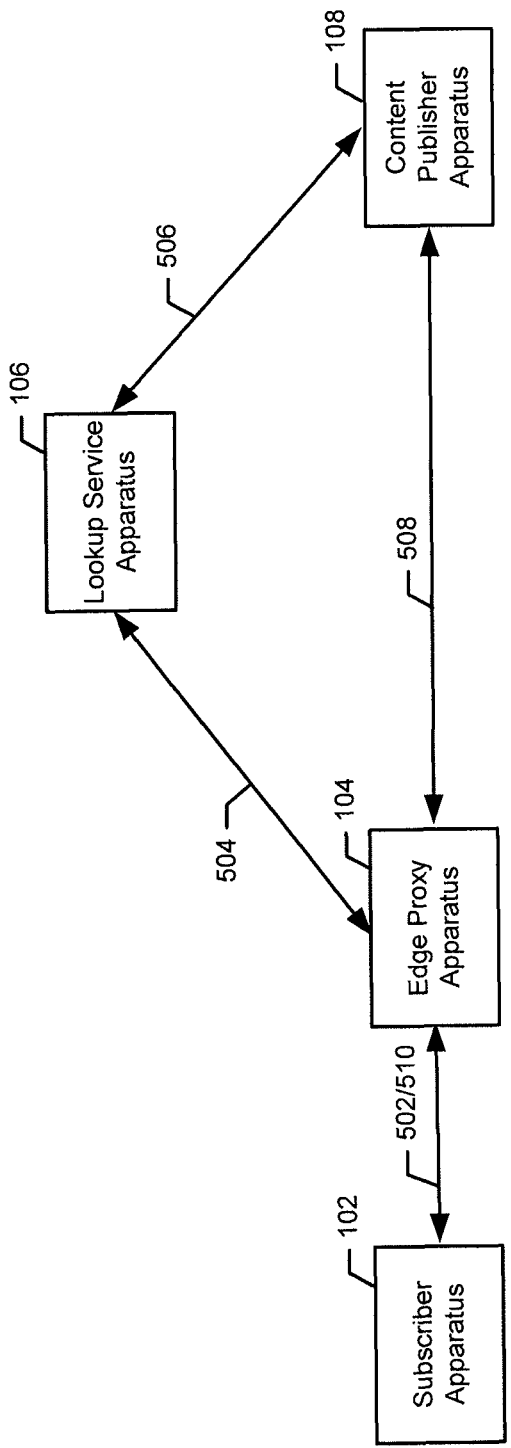
Figure 6:
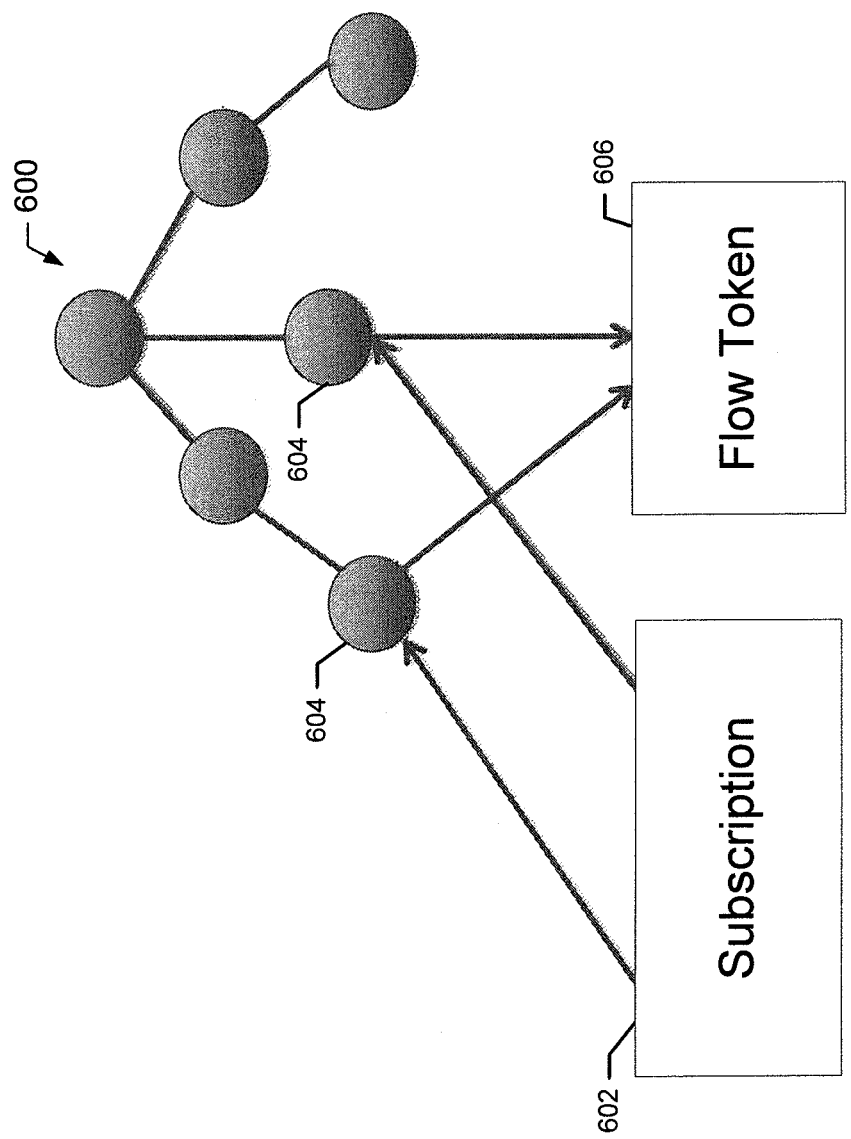
Figure 7:
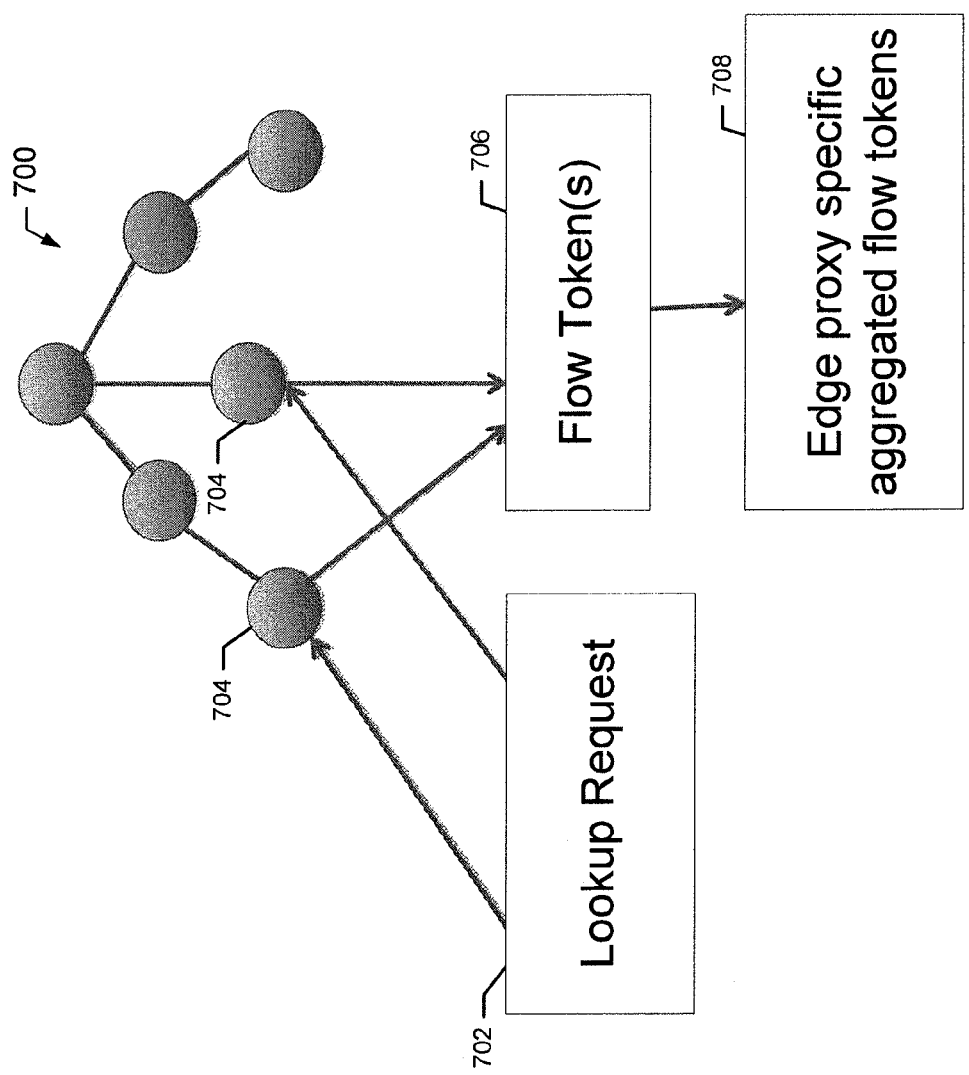
Figure 8:
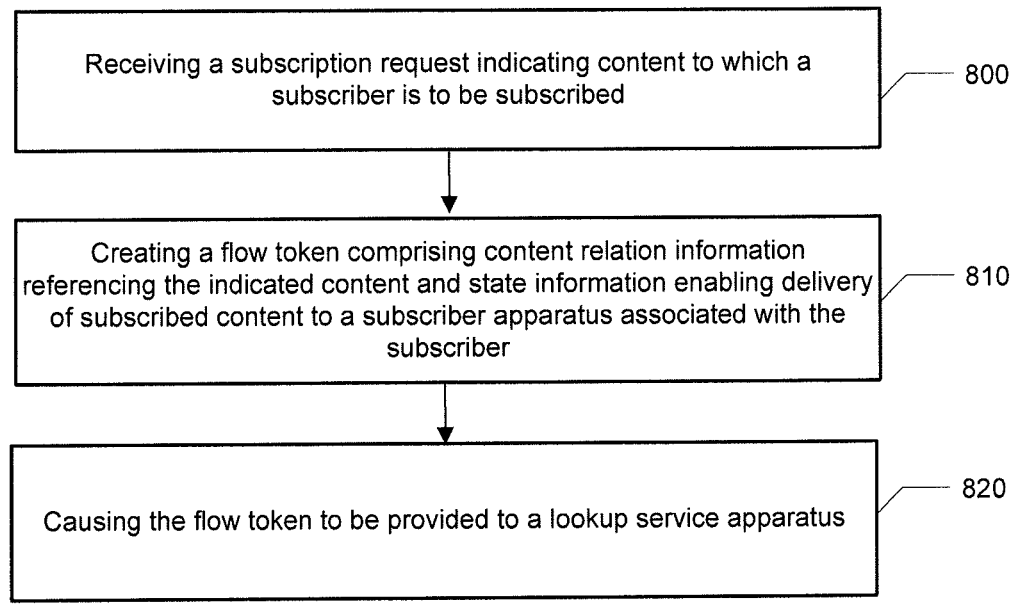
Figure 9:
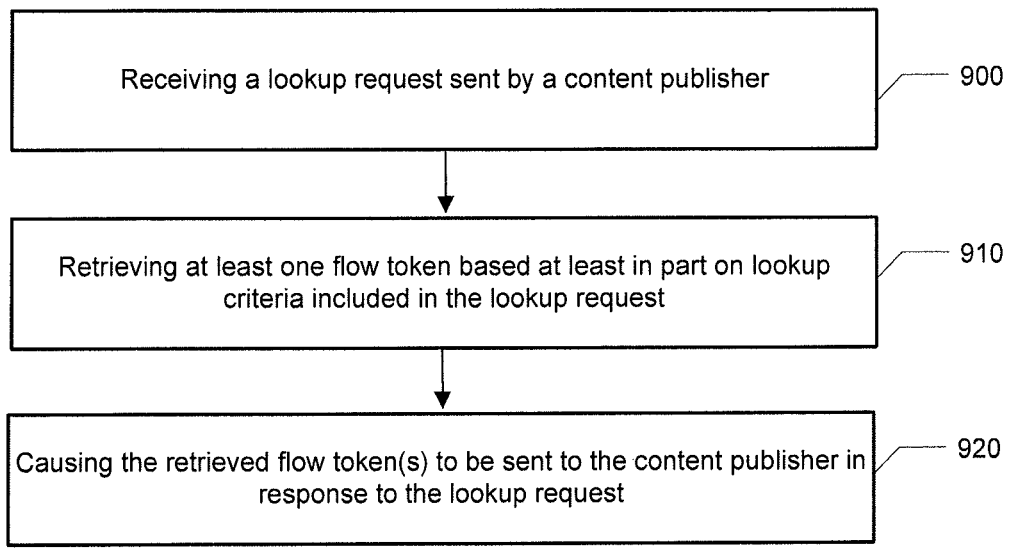
Figure 10:
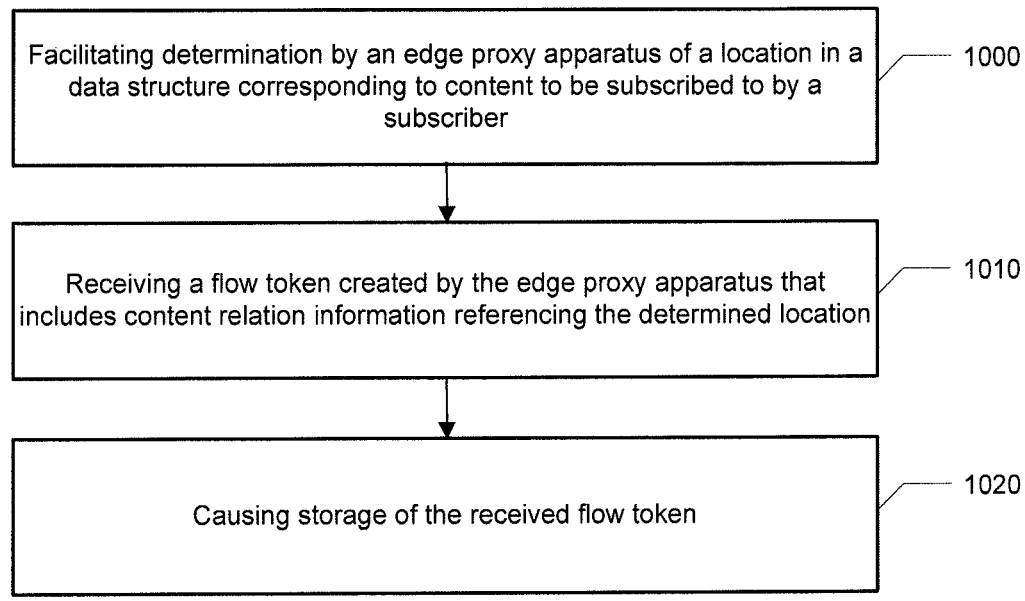

Having thus described example embodiments of the invention in general terms, reference will now be made to the accompanying drawings, which are not necessarily drawn to scale, and wherein:

FIG. 1 illustrates a system for facilitating content distribution according to some example embodiments;

FIG. 2 is a block diagram of an edge proxy apparatus according to some example embodiments;

FIG. 3 illustrates a lookup service apparatus according to some example embodiments;

FIG. 4 illustrates a block diagram of a content publisher apparatus according to some example embodiments;

FIG. 5 illustrates a flow diagram of a system for facilitating content distribution according to some example embodiments;

FIG. 6 illustrates creation of a subscription and flow token according to some example embodiments;

FIG. 7 illustrates retrieval of a flow token by a content publisher according to some example embodiments;

FIG. 8 illustrates a flowchart according to an example method for creating a flow token for facilitating content distribution according to some example embodiments;

FIG. 9 illustrates a flowchart according to an example method for retrieving a flow token for facilitating content distribution according to some example embodiments; and FIG. 10 illustrates a flowchart according to an example method for facilitating content distribution according to some example embodiments.

DETAILED DESCRIPTION

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media may include, for example, coaxial cables, copper wire, fiber optic cables, and carrier waves that travel through space without wires or cables, such as acoustic waves and electromagnetic waves, including radio, optical and infrared waves. Signals may include man-made transient variations in amplitude, frequency, phase, polarization or other physical properties transmitted through the transmission media. Examples of computer-readable media may include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The use of the end-to-end principle for implementing content delivery in networks has resulted in several issues. One of the most notable issues is the imbalance of powers in favor of the sender of information. In this regard, a content publisher or other sender may generally send content to any recipient, even if the recipient has not requested the content, and the network may make a best effort to deliver it to the recipient. This principle has led to increasing problems with unsolicited traffic, such as spam e-mail, and distributed denial of service (DDoS) attacks by malicious parties. An additional issue with the end-to-end principle is that even though a sender may have control over sending packets, the sender may not be able to affect what network routes or transit points are used.

Some example embodiments may facilitate content distribution in accordance with a publish/subscribe (pub/sub) paradigm, which may remedy at least some of the problems facing current network implementations using the end-to-end principle. In pub/sub networking, senders may publish what they want to send and receivers may subscribe to the publications that they want to receive. In principle, in accordance with some example embodiments, a user does not receive any content to which the user has not explicitly expressed an interest by way of subscription.

Referring now to FIG. 1, FIG. 1 illustrates a block diagram of a system 100 for facilitating content distribution according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for facilitating content distribution, numerous other configurations may also be used to implement embodiments of the present invention.

In some example embodiments, the system 100 may include one or more computing devices, which may include one or more subscriber apparatuses 102, one or more edge proxy apparatuses 104, one or more lookup service apparatuses 106, and/or one or more content publisher apparatuses 108. The computing devices of the system 100 may communicate with each other via a network 110. The network 110 may comprise one or more wireless networks (for example, a cellular network, wireless local area network, wireless personal area network, wireless metropolitan area network, and/or the like), one or more wireline networks, or some combination thereof, and in some embodiments may comprise at least a portion of the Internet.

A subscriber apparatus 102 may be embodied as any computing device that may be used by a user to receive subscribed content in accordance with one or more example embodiments. The subscriber apparatus 102 may, for example, be configured to receive content over the network 110, such as via a connection with an edge proxy apparatus 104. A subscriber apparatus may, for example, be embodied as a computer, laptop computer, mobile terminal, mobile computer, mobile phone, mobile communication device, game device, digital camera/camcorder, audio/video player, television device, radio receiver, digital video recorder, positioning device, wrist watch, personal digital assistant (PDA), a chipset, an apparatus comprising a chipset, any combination thereof, and/or the like.

An edge proxy apparatus 104 may comprise any computing device or plurality of computing devices configured to serve as a network node for delivering content to a subscriber apparatus 102, such as over the network 110. In this regard, an edge proxy apparatus 104 may be configured to receive content distributed by a content publisher apparatus 108, such as over the network 110 and deliver the content to an appropriate subscriber apparatus 102. An edge proxy apparatus 104 may accordingly comprise any appropriately configured computing device or plurality of computing devices, such as one or more servers, a server cluster, one or more network nodes, a cloud computing infrastructure, one or more desktop computers, one or more laptop computers, one or more network nodes, multiple computing devices in communication with each other, a chipset, an apparatus comprising a chipset, any combination thereof, and/or the like.

A lookup service apparatus 106 may comprise any computing device or plurality of computing devices configured to store flow tokens and provide a lookup service in accordance with one or more embodiments described herein. In this regard, a lookup service apparatus 106 may be configured to communicate with an edge proxy apparatus 104, such as via the network 110, to facilitate creation of a flow token for a content subscription, which may be stored by the lookup service apparatus 106. The lookup service apparatus 106 may be further configured to provide a lookup service for a content publisher apparatus 108 to enable the content publisher apparatus 108 to access flow tokens for distributing content. A lookup service apparatus 106 may be embodied as any appropriately configured computing device or plurality of computing devices, such as a distributed apparatus, one or more servers, a server cluster, one or more network nodes, a cloud computing infrastructure, one or more desktop computers, one or more laptop computers, one or more network nodes, multiple computing devices in communication with each other, a chipset, an apparatus comprising a chipset, any combination thereof, and/or the like.

A content publisher apparatus 108 may comprise any computing device or plurality of computing devices, which may be used by a content publisher to distribute content to one or more subscriber apparatuses 102. A content publisher apparatus 108 may be configured to obtain a flow token for a content subscriber from a lookup service apparatus 106 and use the flow token to send subscribed content to a subscriber apparatus 102 associated with the subscriber. In this regard, a content publisher apparatus 108 may, for example, be configured to send content to a subscriber apparatus 102 over the network 110 via an edge proxy apparatus 104. A content publisher apparatus 108 may be embodied as any appropriately configured computing device or plurality of computing devices, such as one or more servers, a server cluster, one or more network nodes, a cloud computing infrastructure, one or more desktop computers, one or more laptop computers, one or more network nodes, multiple computing devices in communication with each other, a chipset, an apparatus comprising a chipset, any combination thereof, and/or the like.

Referring now to FIG. 2, FIG. 2 illustrates a block diagram of an edge proxy apparatus 104 according to some example embodiments. In some example embodiments, the edge proxy apparatus 104 may include various means for performing the various functions herein described. These means may comprise one or more of a processor 120, memory 122, communication interface 124, flow token creation module 126, or content delivery module 128. The means of the edge proxy apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 122) that is executable by a suitably configured processing device (for example, the processor 120), or some combination thereof.

In some example embodiments, one or more of the means illustrated in FIG. 2 may be embodied as a chip or chip set. In other words, the edge proxy apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, flow token creation module 126, and/or content delivery module 128 may be embodied as a chip or chip set. The edge proxy apparatus 104 may therefore, in some example embodiments, be configured to implement example embodiments of the present invention on a single chip or as a single "system on a chip." As another example, in some example embodiments, the edge proxy apparatus 104 may comprise component(s) configured to implement embodiments of the present invention on a single chip or as a single "system on a chip." As such, in some cases, a chip or chipset may constitute means for performing one or more operations for providing the functionalities described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 2 as a single processor, in some example embodiments the processor 120 may comprise a plurality of processors. The plurality of processors may be in operative communication with each other and may be collectively configured to perform one or more functionalities of the edge proxy apparatus 104 as described herein. The plurality of processors may be embodied on a single computing device or distributed across a plurality of computing devices collectively configured to function as the edge proxy apparatus 104. In some example embodiments, the processor 120 may be configured to execute instructions stored in the memory 122 or otherwise accessible to the processor 120. These instructions, when executed by the processor 120, may cause the edge proxy apparatus 104 to perform one or more of the functionalities of the edge proxy apparatus 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 2 as a single memory, the memory 122 may comprise a plurality of memories. The plurality of memories may be embodied on a single computing device or may be distributed across a plurality of computing devices collectively configured to function as the edge proxy apparatus 104. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the edge proxy apparatus 104 to carry out various functions in accordance with various example embodiments. For example, in some example embodiments, the memory 122 may be configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the flow token creation module 126 and/or content delivery module 128 during the course of performing their functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. According to some example embodiments, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the edge proxy apparatus 104 and one or more computing devices or computing resources may be in communication. As an example, the communication interface 124 may be configured to enable communication between the edge proxy apparatus 104 and a subscriber apparatus 102 via the network 110. As a further example, the communication interface 124 may be configured to enable communication between the edge proxy apparatus 104 and a lookup service apparatus 106 via the network 110. The communication interface 124 may additionally be in communication with the memory 122, flow token creation module 126, and/or content delivery module 128, such as via a bus.

The flow token creation module 126 may be embodied as various means, such as circuitry, hardware, a computer program product comprising computer readable program instructions stored on a computer readable medium (for example, the memory 122) and executed by a processing device (for example, the processor 120), or some combination thereof and, in some example embodiments, may be embodied as or otherwise controlled by the processor 120. In embodiments wherein the flow token creation module 126 is embodied separately from the processor 120, the flow token creation module 126 may be in communication with the processor 120. The flow token creation module 126 may further be in communication with one or more of the memory 122, communication interface 124, or content delivery module 128, such as via a bus.

The content delivery module 128 may be embodied as various means, such as circuitry, hardware, a computer program product comprising computer readable program instructions stored on a computer readable medium (for example, the memory 122) and executed by a processing device (for example, the processor 120), or some combination thereof and, in some example embodiments, may be embodied as or otherwise controlled by the processor 120. In embodiments wherein the content delivery module 128 is embodied separately from the processor 120, the content delivery module 128 may be in communication with the processor 120. The content delivery module 128 may further be in communication with one or more of the memory 122, communication interface 124, or flow token creation module 126, such as via a bus.

Referring now to FIG. 3, FIG. 3 illustrates a block diagram of a lookup service apparatus 106 according to some example embodiments. In some example embodiments, the lookup service apparatus 106 may include various means for performing the various functions herein described. These means may comprise one or more of a processor 130, memory 132, communication interface 134, or lookup module 136. The means of the lookup service apparatus 106 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 132) that is executable by a suitably configured processing device (for example, the processor 130), or some combination thereof.

In some example embodiments, one or more of the means illustrated in FIG. 3 may be embodied as a chip or chip set. In other words, the lookup service apparatus 106 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 130, memory 132, communication interface 134, and/or lookup module 136 may be embodied as a chip or chip set. The lookup service apparatus 106 may therefore, in some example embodiments, be configured to implement embodiments of the present invention on a single chip or as a single "system on a chip." As another example, in some example embodiments, the lookup service apparatus 106 may comprise component(s) configured to implement embodiments of the present invention on a single chip or as a single "system on a chip." As such, in some cases, a chip or chipset may constitute means for performing one or more operations for providing the functionalities described herein.

The processor 130 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some example embodiments the processor 130 may comprise a plurality of processors. The plurality of processors may be in operative communication with each other and may be collectively configured to perform one or more functionalities of the lookup service apparatus 106 as described herein. The plurality of processors may be embodied on a single computing device or distributed across a plurality of computing devices collectively configured to function as the lookup service apparatus 106. In some example embodiments, the processor 130 may be configured to execute instructions stored in the memory 132 or otherwise accessible to the processor 130. These instructions, when executed by the processor 130, may cause the lookup service apparatus 106 to perform one or more of the functionalities of the lookup service apparatus 106 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may comprise, for example, volatile memory, non-volatile memory, or some combination thereof. In this regard, the memory 132 may comprise a non-transitory computer-readable storage medium. Although illustrated in FIG. 3 as a single memory, the memory 132 may comprise a plurality of memories. The plurality of memories may be embodied on a single computing device or may be distributed across a plurality of computing devices collectively configured to function as the lookup service apparatus 106. In various example embodiments, the memory 132 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the lookup service apparatus 106 to carry out various functions in accordance with various example embodiments. For example, in some example embodiments, the memory 132 may be configured to buffer input data for processing by the processor 130. Additionally or alternatively, the memory 132 may be configured to store program instructions for execution by the processor 130. The memory 132 may store information in the form of static and/or dynamic information. The stored information may, for example, include one or more stored flow tokens, at least a portion of a data structure representing a content space, and/or the like. This stored information may be stored and/or used by the lookup module 136 during the course of performing its functionalities.

The communication interface 134 may be embodied as any device or means embodied in circuitry, hardware, a computer program product comprising computer readable program instructions stored on a computer readable medium (for example, the memory 132) and executed by a processing device (for example, the processor 130), or a combination thereof that is configured to receive and/or transmit data from/to another computing device. According to some example embodiments, the communication interface 134 may be at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with one or more remote computing devices. The communication interface 134 may be configured to receive and/or transmit data using any protocol that may be used for communications between computing devices. In this regard, the communication interface 134 may be configured to receive and/or transmit data using any protocol that may be used for transmission of data over a wireless network, wireline network, some combination thereof, or the like by which the lookup service apparatus 106 and one or more computing devices or computing resources may be in communication. As an example, the communication interface 134 may be configured to enable communication between the lookup service apparatus 106 and an edge proxy apparatus 104 via the network 110. As a further example, the communication interface 134 may be configured to enable communication between the lookup service apparatus 106 and a content publisher apparatus 108 via the network 110. The communication interface 134 may additionally be in communication with the memory 132 and/or lookup module 136, such as via a bus.

The lookup module 136 may be embodied as various means, such as circuitry, hardware, a computer program product comprising computer readable program instructions stored on a computer readable medium (for example, the memory 132) and executed by a processing device (for example, the processor 130), or some combination thereof and, in some example embodiments, may be embodied as or otherwise controlled by the processor 130. In embodiments wherein the lookup module 136 is embodied separately from the processor 130, the lookup module 136 may be in communication with the processor 130. The lookup module 136 may further be in communication with the memory 132 and/or the communication interface 134, such as via a bus.

FIG. 4 illustrates a block diagram of a content publisher apparatus 108 according to some example embodiments. In some example embodiments, the content publisher apparatus 108 may include various means for performing the various functions herein described. These means may comprise one or more of a processor 140, memory 142, communication interface 144, or content distribution module 146. The means of the content publisher apparatus 108 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 142) that is executable by a suitably configured processing device (for example, the processor 140), or some combination thereof.

In some example embodiments, one or more of the means illustrated in FIG. 4 may be embodied as a chip or chip set. In other words, the content publisher apparatus 108 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 140, memory 142, communication interface 144, and/or content distribution module 146 may be embodied as a chip or chip set. The content publisher apparatus 108 may therefore, in some example embodiments, be configured to implement embodiments of the present invention on a single chip or as a single "system on a chip." As another example, in some example embodiments, the content publisher apparatus 108 may comprise component(s) configured to implement embodiments of the present invention on a single chip or as a single "system on a chip." As such, in some cases, a chip or chipset may constitute means for performing one or more operations for providing the functionalities described herein.

The processor 140 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some example embodiments the processor 140 may comprise a plurality of processors. The plurality of processors may be in operative communication with each other and may be collectively configured to perform one or more functionalities of the content publisher apparatus 108 as described herein. The plurality of processors may be embodied on a single computing device or distributed across a plurality of computing devices collectively configured to function as the content publisher apparatus 108. In some example embodiments, the processor 140 is configured to execute instructions stored in the memory 142 or otherwise accessible to the processor 140. These instructions, when executed by the processor 140, may cause the content publisher apparatus 108 to perform one or more of the functionalities of the content publisher apparatus 108 as described herein. As such, whether configured by hardware or software methods, or by a combination thereof, the processor 140 may comprise an entity capable of performing operations according to embodiments of the present invention while configured accordingly. Thus, for example, when the processor 140 is embodied as an ASIC, FPGA or the like, the processor 140 may comprise specifically configured hardware for conducting one or more operations described herein. Alternatively, as another example, when the processor 140 is embodied as an executor of instructions, such as may be stored in the memory 142, the instructions may specifically configure the processor 140 to perform one or more algorithms and operations described herein.

The memory 142 may comprise, for example, volatile memory, non-volatile memory, or some combination thereof. In this regard, the memory 142 may comprise a non-transitory computer-readable storage medium. Although illustrated in FIG. 4 as a single memory, the memory 142 may comprise a plurality of memories. The plurality of memories may be embodied on a single computing device or may be distributed across a plurality of computing devices collectively configured to function as the content publisher apparatus 108. In various example embodiments, the memory 142 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 142 may be configured to store information, data, applications, instructions, or the like for enabling the content publisher apparatus 108 to carry out various functions in accordance with various example embodiments. For example, in some example embodiments, the memory 142 may be configured to buffer input data for processing by the processor 140. Additionally or alternatively, the memory 142 may be configured to store program instructions for execution by the processor 140. The memory 142 may store information in the form of static and/or dynamic information. This stored information may be stored and/or used by the content distribution module 146 during the course of performing its functionalities.

The communication interface 144 may be embodied as any device or means embodied in circuitry, hardware, a computer program product comprising computer readable program instructions stored on a computer readable medium (for example, the memory 142) and executed by a processing device (for example, the processor 140), or a combination thereof that is configured to receive and/or transmit data from/to another computing device. According to some example embodiments, the communication interface 144 may be at least partially embodied as or otherwise controlled by the processor 140. In this regard, the communication interface 144 may be in communication with the processor 140, such as via a bus. The communication interface 144 may include, for example, an antenna, a transmitter, a receiver, a transceiver and/or supporting hardware or software for enabling communications with one or more remote computing devices. The communication interface 144 may be configured to receive and/or transmit data using any protocol that may be used for communications between computing devices. In this regard, the communication interface 144 may be configured to receive and/or transmit data using any protocol that may be used for transmission of data over a wireless network, wireline network, some combination thereof, or the like by which the content publisher apparatus 108 and one or more computing devices or computing resources may be in communication. As an example, the communication interface 144 may be configured to enable communication between the content publisher apparatus 108 and one or more of a subscriber apparatus 102, edge proxy apparatus 104, or lookup service apparatus 106, via the network 110. The communication interface 144 may additionally be in communication with the memory 142, and/or content distribution module 146, such as via a bus.

The content distribution module 146 may be embodied as various means, such as circuitry, hardware, a computer program product comprising computer readable program instructions stored on a computer readable medium (for example, the memory 142) and executed by a processing device (for example, the processor 140), or some combination thereof and, in some example embodiments, may be embodied as or otherwise controlled by the processor 140. In embodiments wherein the content distribution module 146 is embodied separately from the processor 140, the content distribution module 146 may be in communication with the processor 140. The content distribution module 146 may further be in communication with one or more of the memory 142, or communication interface 144, such as via a bus.

Referring now to FIG. 5, FIG. 5 illustrates a flow diagram of a system for facilitating content distribution according to some example embodiments. Operation 502 may comprise the subscriber apparatus 102 initiating a connection with an edge proxy apparatus 104. A user of the subscriber apparatus 102 may select content (for example, a category of content, a content stream, content feed, and/or the like) to which the user wishes to subscribe. The subscriber apparatus 102 may accordingly send a subscription request indicating the selected content to which the user is to be subscribed to the edge proxy apparatus 104.

Operation 504 may comprise the flow token creation module 126 creating a flow token. The flow token may include state information enabling delivery of subscribed content to the subscriber apparatus 102. In this regard, the state information may include information for reconstructing a connection state for the connection between the subscriber apparatus 102 and edge proxy apparatus 104. As such, the edge proxy apparatus 104 may not maintain complete state information for the connection with the subscriber apparatus 102. Accordingly, the edge proxy apparatus 104 may comprise a stateless edge proxy. In some example embodiments wherein the connection between the subscriber apparatus 102 and the edge proxy apparatus 104 comprises a Transmission Control Protocol/Internet Protocol (TCP/IP) connection, the edge proxy apparatus 104 may maintain the connection and the state information in the flow token may include a connection identifier for the connection that may be recognized by the content delivery module 128. In some example embodiments wherein the connection between the subscriber apparatus 102 and edge proxy apparatus 104 comprises a user datagram protocol (UDP) connection, the state information included in the flow token may comprise an IP address of the subscriber apparatus 102, a protocol used by the subscriber apparatus 102, and/or the like. In some example embodiments wherein the connection between the subscriber apparatus 102 and edge proxy apparatus 104 comprises a session initiation protocol (SIP) connection (for example, using TCP, UDP, or the like), the subscriber apparatus 102 may not maintain any state information. As such, the edge proxy apparatus 104 may not need to maintain any state information in some example embodiments wherein the connection is a UDP connection.

The flow token may further include information identifying the edge proxy apparatus 104. This identifying information may include, for example, a network address (for example, an IP address and/or a fully qualified domain name (FQDN)) of the edge proxy apparatus 104 or other information identifying the edge proxy apparatus 104 to enable the content publisher apparatus 108 to send data to the edge proxy apparatus 104. Accordingly, the information identifying the edge proxy apparatus 104 may be used by the content publisher apparatus 108 when distributing to content to send subscribed content to the subscriber apparatus 102 via the edge proxy apparatus 104.

The flow token created in operation 504 may further include content relation information referencing the content to which the user is to be subscribed. The content relation information may, for example, comprise a name of the subscribed content, a declarative statement defining the subscribed content, a resource identifier (for example, a uniform resource identifier) of the subscribed content, an encoded value representative of the subscribed content, and/or the like. In some example embodiments, the content relation information may comprise a reference to a location in a data structure maintained by the lookup service apparatus 106. In this regard, the lookup module 136 may maintain a data structure representative of a content space. The data structure may, for example, comprise a graph-based data structure, tree, ordered list, array, and/or the like. The data structure may comprise a plurality of locations (for example, nodes, positions, addresses, and/or the like). A location of the data structure may correspond to a particular content type, content category, content stream, content feed, content resource, and/or the like. Accordingly, the plurality of locations may map a content space of available content that may be provided by one or more content publishers. As such, in some example embodiments wherein the content relation information included in a flow token comprises a reference to a location in a data structure, the location in the data structure may comprise a location in the data structure corresponding to the subscribed content.

Referring now to FIG. 6, FIG. 6 illustrates creation of a subscription and flow token according to some example embodiments wherein a data structure is maintained by the lookup service apparatus 106 and used to represent a content space. In this regard, FIG. 6 illustrates a portion of an example graph-based data structure 600, which may be maintained by the lookup service apparatus 106. The graph-based data structure 600 may, for example, comprise an ordered content hierarchy (for example, with a parent node representing a category of content and a child node representing a sub-category of content and/or a specific content), a forest, a partially ordered set (POSET), a directed acyclic graph (DAG), or other ordered data structure having a plurality of locations or nodes that collectively represent a content space of content that may be distributed by one or more content publishers. The flow token creation module 126 may accordingly be configured to determine a location in the data structure corresponding to the subscribed content indicated in the subscription request. As illustrated in FIG. 6, the flow token creation module 126 may determine one or more nodes 604 in the graph-based data structure 600 that are associated with the subscribed content 602. The location(s) of the nodes 604 may be included in the flow token 606.

The lookup module 136 may be configured to facilitate determination by the flow token creation module 126 of a location in a data structure corresponding to subscribed content. In this regard, the flow token creation module 126 may, for example, send a lookup request including an indication or description of the subscribed content to the lookup service apparatus 106. The lookup module 136 may determine the location(s) of the data structure which correspond to the subscribed content and send a reference(s) the determined location(s) to the edge proxy apparatus 104. As another example, the lookup module 136 may send at least a portion of the data structure and/or otherwise provide access to at least a portion of the data structure to the edge proxy apparatus 104 and the flow token creation module 126 may determine the location(s) of the data structure which correspond to the subscribed content.

The flow token creation module 126 may be configured to include additional information in a flow token in addition to content relation information and state information. For example, the flow token creation module 126 may include security information in a flow token. The security information may, for example, include a digital signature, certificate, and/or the like that may enable security verification of a flow token by one or more entities of the system 100. In some example embodiments, the security information may include a computational puzzle or challenge that a publisher may need to solve as a requirement for distributing published subscribed content. Accordingly, the content distribution module 146, may, in some example embodiments, be configured to solve a computational puzzle or challenge included in a flow token. The content distribution module 146 may include a solution for a puzzle in subscribed content data sent to an edge proxy apparatus 104 and the content delivery module 128 may verify the solution prior to delivering the content to a subscriber apparatus 102. In this regard, the content delivery module 128 may, for example, independently solve the puzzle and compare the solution with that included in the subscribed content data by the content distribution module 146. As another example, the content delivery module 128 may compare the solution included in the subscribed content data to a pre-stored valid solution, such as may have been generated and stored by the flow token creation module 126 at the time of creation of the flow token.

In some example embodiments, the lookup module 136 may be configured to update a computational puzzle and/or challenge included in a stored flow token. For example, the lookup module 136 may update a computational puzzle or challenge in accordance with a defined freshness policy, such as following each retrieval of a flow token by a publisher, periodically, and/or the like.

The flow token may further include a validity time, expiration time, and/or the like. In this regard, the subscription may have an expiration date, after which the flow token may no longer be valid. Such an expiration date may, for example, be used for paid content such that a flow token may be invalid and/or purged by the lookup service apparatus 106 once a subscriber's subscription has expired.

In some example embodiments, the flow token creation module 126 may be configured to issue a computational puzzle or challenge to a subscriber and/or subscriber apparatus 102 at the time of a subscription creation. Solving this computational puzzle or challenge may be a requirement prior to the flow token creation module 126 creating a flow token for a subscription.

In some example embodiments, the flow token creation module 126 may be configured to aggregate multiple subscribers into a single flow token. In this regard, the flow token creation module 126 may create and/or update an existing flow token to include state information for connections with a plurality of subscriber apparatuses 102 associated with users subscribed to the same content. Accordingly, a content publisher may retrieve and use a single flow token to deliver content to a plurality of subscribers. Such an aggregated flow token may, for example, be used for subscribers to multicast content.

Referring again to FIG. 5, operation 504 may further comprise the flow token creation module 126 providing the created flow token to the lookup service apparatus 106. The lookup module 136 may receive the flow token and cause storage of the flow token in the memory 132, from which it may be retrieved by a content publisher when needed for distributing subscribed content.

Operation 506 may comprise the content publisher apparatus 108 looking up one or more flow tokens for a subscriber(s) to subscribed content being distributed by a content publisher. In this regard, the content distribution module 146 may send a lookup request including lookup criteria to the lookup service apparatus 106. The lookup criteria included in the lookup request may comprise content description information, such as, a description of the subscribed content to be distributed, a name of the subscribed content, a resource identifier (for example, a uniform resource identifier) of the subscribed content, an encoded value representative of the subscribed content, and/or the like. The lookup criteria included in the lookup request may additionally or alternatively comprise subscriber identity information, such as an identity of one or more users/subscribers, an identity of one or more subscriber apparatuses 102, and/or the like.

The lookup module 136 may receive the lookup request and retrieve one or more flow tokens matching the lookup criteria in the lookup request. For example, where the lookup criteria in the lookup request comprises subscriber identity information, the lookup module 136 may identify and retrieve one or more flow tokens referencing a particular user(s)/subscriber(s), a particular subscriber apparatus(es) 102, and/or the like. Additionally or alternatively, where the lookup criteria in the lookup request comprises content description information, the lookup module 136 may retrieve one or more flow tokens having content relation information corresponding to the content description information in the lookup request. In this regard, the lookup module 136 may, for example, search at least a portion of stored flow tokens to identify those including content relation information corresponding to the content description information included in the lookup request. Additionally or alternatively, in some example embodiments wherein a data structure representing a content space is maintained by the lookup service apparatus 106, the lookup module 136 may access the data structure and determine one or more locations associated with content corresponding to the content description information included in the lookup request. The lookup module 136 may identify and retrieve one or more flow tokens comprising content relation information referencing the determined location(s). The lookup module 136 may cause the retrieved flow token(s) to be sent to the content publisher apparatus 108 in response to the lookup request.

Referring now to FIG. 7, FIG. 7 illustrates retrieval of a flow token by a content publisher according to some example embodiments wherein a data structure is maintained by the lookup service apparatus 106 and used to represent a content space. In this regard, FIG. 7 illustrates a portion of an example graph-based data structure 700, which may be maintained by the lookup service apparatus 106. The graph-based data structure 700 may, for example, be substantially similar to the graph-based data structure 600. The lookup module 136 may receive a lookup request 702 submitted by the content publisher apparatus 108 and determine one or more nodes (for example, locations) 704 in the graph-based data structure 700 that are associated with content corresponding to content description information included in the lookup request. The lookup module 136 may retrieve one or more flow tokens 706 that comprise content relation information referencing the determined node(s) 704. The lookup module 136 may cause the retrieved flow token(s) 706 to be sent to the content publisher apparatus 108. In some example embodiments, the lookup module 136 may aggregate retrieved flow tokens by edge proxy apparatus 104, as illustrated by 708. In this regard, the retrieved flow tokens may include information referencing an edge proxy apparatus(es) 104. Accordingly, the retrieved flow tokens may be grouped into one or more groups, with each group including flow tokens referencing a different edge proxy apparatus 104 or a different set of edge proxy apparatuses 104. Thus flow tokens for the same subscribed content for a group of subscribers reachable via the same edge proxy apparatus 104 may be grouped into a single group. The lookup module 136 may aggregate a group of grouped flow tokens into as ingle flow token. The lookup module 136 may cause an aggregated flow token 708 to be sent to the content publisher apparatus 108. Accordingly, for example, rather than issuing 1000 flow tokens for the same subscribed content for a group of 1000 subscribers reachable via the same edge proxy apparatus 104, the lookup module 136 may issue a single aggregated flow token.

The content distribution module 146 may receive the flow token(s) sent by the lookup service apparatus 106 in response to the lookup request. Referring again to FIG. 5, the content distribution module 146 may send subscribed content destined to one or more subscriber apparatuses 102 using a received flow token, at operation 508. In this regard, the content distribution module 146 may include at least a portion of the flow token (e.g, at least a portion of the flow token including state information to enable an edge proxy apparatus 104 to reconstruct a connection state) in the subscribed content to be distributed. The content distribution module 146 may, for example, send subscribed content including at least a portion of a flow token to a particular edge proxy apparatus 104 identified in the flow token. In this regard, the use of flow tokens to distribute content by a content publisher may enable a publish/subscribe paradigm of content distribution wherein a content publisher may only be able to send content to a given subscriber (for example, to a given subscriber apparatus 102) if it has the appropriate flow token.

The content delivery module 128 of the edge proxy apparatus 104 may receive subscribed content sent by the content publisher apparatus 108. The content delivery module 128 may use the at least a portion of the flow token included in the received subscribed content to deliver the subscribed content to an appropriate subscriber apparatus 102, at operation 510. In this regard, the content delivery module 128 may utilize state information included in the at least a portion of the flow token to reconstruct a connection state for a connection between the edge proxy apparatus 104 and subscriber apparatus 102 and send the subscribed content over the connection. Accordingly, for example, the content delivery module 128 may reconstruct a state of a SIP connection and send the subscribed content over the SIP connection. As another example, the content delivery module 128 may identify a TCP/IP connection based on the state information and send the subscribed content over the identified connection. As still a further example, the content delivery module 128 may determine a network address (for example, an IP address and/or FQDN) of a subscriber apparatus 102, a protocol, and/or the like based on the state information and deliver the subscribed content to the determined network address using the determined protocol.

In some example embodiments wherein the lookup service apparatus 106 maintains a data structure representing a content space, the data structure may be updated in response to a change in the content space. In this regard, a content publisher may make additional or less content available for distribution. Accordingly a data structure may be updated by the content distribution module 146 and/or by the lookup module 136 to reflect a change in the scope of available content.

FIG. 8 illustrates a flowchart according to an example method for creating a flow token for facilitating content distribution according to some example embodiments. In this regard, FIG. 8 illustrates operations that may be performed at an edge proxy apparatus 104. The operations illustrated in and described with respect to FIG. 8 may, for example, be performed by, with the assistance of, and/or under the control of one or more of the processor 120, memory 122, communication interface 124, or flow token creation module 126. Operation 800 may comprise receiving a subscription request indicating content to which a subscriber is to be subscribed. The processor 120, memory 122, communication interface 124, and/or flow token creation module 126 may, for example, provide means for performing operation 800. Operation 810 may comprise creating a flow token comprising content relation information referencing the indicated content and state information enabling delivery of subscribed content to a subscriber apparatus 102 associated with the subscriber. The processor 120, memory 122, communication interface 124, and/or flow token creation module 126 may, for example, provide means for performing operation 810. Operation 820 may comprise causing the flow token to be provided to a lookup service apparatus 106. The processor 120, memory 122, communication interface 124, and/or flow token creation module 126 may, for example, provide means for performing operation 820.

FIG. 9 illustrates a flowchart according to an example method for retrieving a flow token for facilitating content distribution according to some example embodiments. In this regard, FIG. 9 illustrates operations that may be performed at a lookup service apparatus 106. The operations illustrated in and described with respect to FIG. 9 may, for example, be performed by, with the assistance of, and/or under the control of one or more of the processor 130, memory 132, communication interface 134, or lookup module 136. Operation 900 may comprise receiving a lookup request sent by a content publisher apparatus 108. The processor 130, memory 132, communication interface 134, and/or lookup module 136 may, for example, provide means for performing operation 900. Operation 910 may comprise retrieving at least one flow token based at least in part on lookup criteria included in the lookup request. The processor 130, memory 132, and/or lookup module 136 may, for example, provide means for performing operation 910. Operation 920 may comprise causing the retrieved flow token(s) to be sent to the content publisher apparatus 108 in response to the lookup request. The processor 130, memory 132, communication interface 134, and/or lookup module 136 may, for example, provide means for performing operation 920.

FIG. 10 illustrates a flowchart according to an example method for facilitating content distribution according to some example embodiments. In this regard, FIG. 10 illustrates operations that may be performed at a lookup service apparatus 106. The operations illustrated in and described with respect to FIG. 10 may, for example, be performed by, with the assistance of, and/or under the control of one or more of the processor 130, memory 132, communication interface 134, or lookup module 136. Operation 1000 may comprise facilitating determination by an edge proxy apparatus 104 of a location in a data structure corresponding to content to be subscribed to by a subscriber. The processor 130, memory 132, communication interface 134, and/or lookup module 136 may, for example, provide means for performing operation 1000. Operation 1010 may comprise receiving flow token created by the edge proxy apparatus 104 that includes content relation information referencing the determined location. The processor 130, memory 132, communication interface 134, and/or lookup module 136 may, for example, provide means for performing operation 1010. Operation 1020 may comprise causing storage of the received flow token. The processor 130, memory 132, and/or lookup module 136 may, for example, provide means for performing operation 1020.

FIGS. 8-10 each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 122, in the memory 132, and/or in the memory 142) and executed by a processor in the computing device (for example, by the processor 120, by the processor 130, and/or by the processor 140). In some example embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a subscriber apparatus 102, an edge proxy apparatus 104, a lookup service apparatus 106, and/or a content publisher apparatus 108) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a subscriber apparatus 102, an edge proxy apparatus 104, a lookup service apparatus 106, and/or a content publisher apparatus 108) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. According to some example embodiments, a suitably configured processor (for example, the processor 120, processor 130, and/or processor 140) may provide all or a portion of the elements. In other example embodiments, all or a portion of the elements may be configured by and operate under control of a computer program product. The computer program product for performing the methods of some example embodiments may include a computer-readable storage medium (for example, the memory 122, memory 132, and/or memory 142), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
receiving, at an edge proxy apparatus, a subscription request indicating content to which a subscriber is to be subscribed;
creating a flow token comprising content relation information referencing the indicated content and state information enabling delivery of subscribed content to a subscriber apparatus associated with the subscriber;
causing the flow token to be provided to a lookup service apparatus configured to provide access to flow tokens to one or more content publishers;
receiving subscribed content and at least a portion of the flow token; and
using the at least a portion of the flow token to deliver the subscribed content to the subscriber apparatus, wherein using the at least a portion of the flow token comprises recreating a connection state for a connection between the edge proxy apparatus and the subscriber apparatus based at least in part on the state information included in the at least a portion of the flow token.

2. The method of claim 1, wherein receiving the subscription request comprises receiving the subscription request via a connection between the subscriber apparatus and the edge proxy apparatus, and wherein the state information comprises state information for the connection.

3. The method of any of claim 1, wherein the edge proxy apparatus does not maintain complete state information for a connection with the subscriber apparatus.

4. The method of any of claim 1, wherein the flow token further includes information identifying the edge proxy apparatus to enable a content publisher to send subscribed content to the subscriber apparatus via the edge proxy apparatus.

5. The method of any of claim 1, wherein the content relation information comprises a reference to a location in a data structure maintained by the lookup service apparatus, wherein the location in the data structure is associated with the indicated content.

6. The method of claim 5, further comprising:
determining, based at least in part on the content indicated in the subscription request, the location in the data structure.

7. An apparatus comprising at least one processor and at least one memory storing computer program code, wherein the at least one memory and stored computer program code are configured, with the at least one processor, to cause the apparatus to at least:
receive a subscription request indicating content to which a subscriber is to be subscribed;
create a flow token comprising content relation information referencing the indicated content and state information enabling delivery of subscribed content to a subscriber apparatus associated with the subscriber;
cause the flow token to be provided to a lookup service apparatus configured to provide access to flow tokens to one or more content publishers;
receive subscribed content and at least a portion of the flow token; and
use the at least a portion of the flow token to deliver the subscribed content to the subscriber apparatus wherein using the at least a portion of the flow token comprises recreating a connection state for a connection between the apparatus and the subscriber apparatus based at least in part on the state information included in the at least a portion of the flow token.

8. The apparatus of claim 7, wherein the at least one memory and stored computer program code are configured, with the at least one processor, to cause the apparatus to receive the subscription request via a connection between the subscriber apparatus and the apparatus, and wherein the state information comprises state information for the connection.

9. The apparatus of any of claim 7, wherein the apparatus does not maintain complete state information for a connection with the subscriber apparatus.

10. The apparatus of any of claim 7, wherein the flow token further includes information identifying the apparatus to enable a content publisher to send subscribed content to the subscriber apparatus via the apparatus.

11. The apparatus of claim 7, wherein the content relation information comprises a reference to a location in a data structure maintained by the lookup service apparatus, wherein the location in the data structure is associated with the indicated content.

12. The apparatus of claim 11, wherein the at least one memory and stored computer program code are configured, with the at least one processor, to further cause the apparatus to determine, based at least in part on the content indicated in the subscription request, the location in the data structure.

13. The apparatus of any of claim 7, wherein the apparatus comprises or is embodied on an edge proxy apparatus.

14. A computer program product comprising at least one non-transitory computer-readable storage medium having computer-readable program instructions stored therein, the computer-readable program instructions comprising program instructions configured to:
receive a subscription request indicating content to which a subscriber is to be subscribed;
create a flow token comprising content relation information referencing the indicated content and state information enabling delivery of subscribed content to a subscriber apparatus associated with the subscriber;
cause the flow token to be provided to a lookup service apparatus configured to provide access to flow tokens to one or more content publishers;
receive subscribed content and at least a portion of the flow token; and
use the at least a portion of the flow token to deliver the subscribed content to the subscriber apparatus wherein using the at least a portion of the flow token comprises recreating a connection state for a connection between an edge proxy apparatus and the subscriber apparatus based at least in part on the state information included in the at least a portion of the flow token.

* * * * *

UNITED STATES PATENT AND TRADEMARK OFFICE
CERTIFICATE OF CORRECTION

| | | |
|---|---|---|
| PATENT NO. | : 9,059,883 B2 | Page 1 of 1 |
| APPLICATION NO. | : 13/980737 | |
| DATED | : June 16, 2015 | |
| INVENTOR(S) | : Tarkoma | |

It is certified that error appears in the above-identified patent and that said Letters Patent is hereby corrected as shown below:

In the claims:

Column 21,
Lines 27, 30, and 34, "The method of any of claim 1" should read --The method of claim 1--.

Column 22,
Lines 15, 18, and 32, "The apparatus of any of claim 7" should read --The apparatus of claim 7--.

Signed and Sealed this
First Day of March, 2016

Michelle K. Lee
*Director of the United States Patent and Trademark Office*